March 8, 1927.  1,619,812

M. N. A. DEVELAY

TIRE FOR VEHICLE WHEELS

Filed June 10, 1922

Inventor:
Marie Nicolas Albert Develay
By
Atty.

Patented Mar. 8, 1927.

1,619,812

UNITED STATES PATENT OFFICE.

MARIE NICOLAS ALBERT DEVELAY, OF PARIS, FRANCE.

TIRE FOR VEHICLE WHEELS.

Application filed June 10, 1922, Serial No. 567,346, and in France June 14, 1921.

One object of my invention is to provide means for ensuring a uniform cooling of the tire during use.

Another object of my invention is to provide an elastic support of the outer casing during the movement of the vehicle.

An additional object of my invention is to provide a new type of inner tube having positioning flaps for maintaining the inner tube in place.

With these and other objects in view the invention consists in certain novel features of construction as hereinafter shown and described and then specifically pointed out in the claims.

Figure 1:
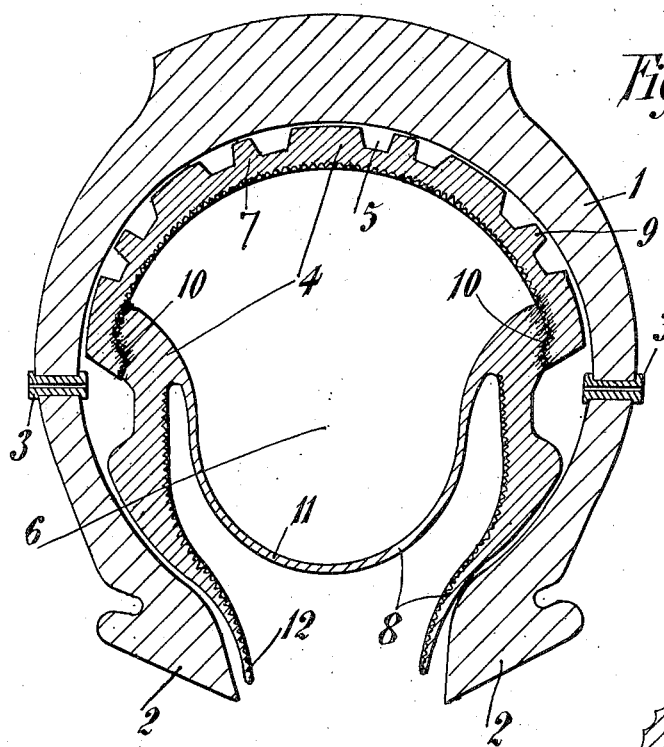
Figure 3:
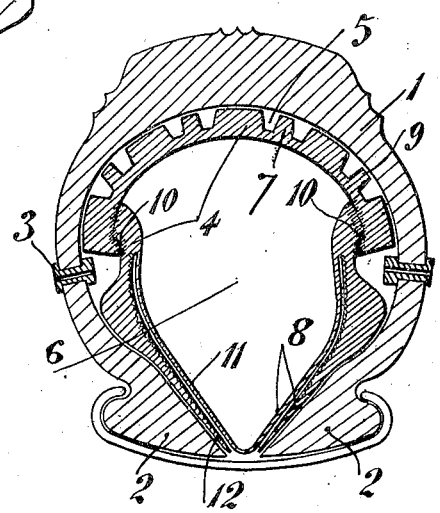
Figure 2:
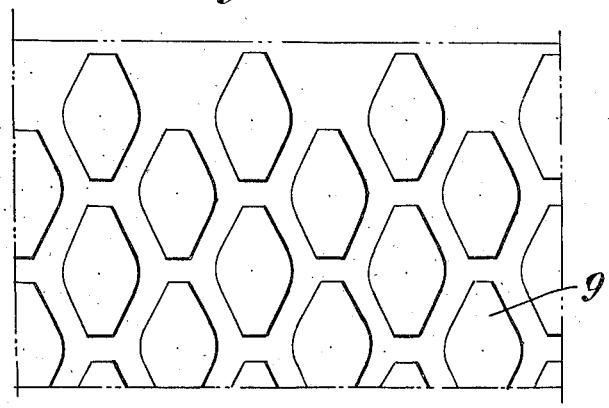

A preferred embodiment of my invention is shown on the drawing, on which Fig. 1 is a transverse section through the tire, and Fig. 2 a partial development of the outer surface of the inner tube of the tire, while Fig. 3 is a sectional view similar to Fig. 1 showing the tire in position on a conventional rim.

The tire shown by way of example comprises an outer casing 1, such as is found on the market and which is provided in a well-known manner, with beads 2. Ventilating apertures 3 extend through the sides of the said casing, establishing communication between the inner compartment 5 and the atmosphere, which insures a uniform cooling of the whole tire and more particularly of the sides of the tire.

A housing 4 is provided in the interior of the outer casing 1, dividing the inner free space of said casing into two separated superposed compartments 5 and 6.

The said housing is made of two parts 7 and 8; the one, 7 of thick rubber, presents protuberances 9, having the shape of little prisms with an octagonal base, and insuring the elastic support of the outer casing 1 by the housing 4 during the movement of the vehicle.

The other part 8 of the housng 4 bears at 10 on the part 7 to be united thereto by vulcanization. The part 8 comprises a portion 11 of thin rubber adapted to act as an extensible membrane, and two flaps 12.

The housing 4 thus constitutes an extensible compartment 6, which can be easily inflated by compressed air. When the compressed air is introduced into this chamber 6, the membrane 11 of soft rubber is distended and forces the flaps 12 against the beads 2 of the outer casing 1, thus positioning and maintaining the inner tube firmly in place. The parts 7 and 8 thus form a new type of inner tube, the compressed air forced in the chamber 6 causing the housing 4 to function as an inner tube of the usual type, the thick rubber protuberances 9 furnishing an additional elastic support, and the flexible membrane 11, through pressure on flaps 12, maintaining the inner tube in position while the air channels in part 7 permit cooling of the tire.

As will be seen, the two parts 7, 8, of the housing 4 above referred to can be molded independent of each other, which insures an easy manufacture of the air chamber 6.

The main advantages which are secured by the present invention are the following:

1. Maintenance of the outer casing without any deformation beyond the normal conditions;
2. Reduction of the volume of the air-tube, the axis of which lies nearer the wheel rim;
3. Greater resiliency owing to the triple elasticity of the outer casing, the compartment 5 acting as a hollow tire and the compartment 6 acting as a pneumatic tube;
4. Distribution and deadening of the shocks;
5. Effective ventilation by the ducts in the compartment 5, preventing accumulation of heat and, consequently, heating of the pneumatic tube;
6. Normal and continuous running upon the bearing parts (with varying resting-points) of the compartment 5, which is supported by the pneumatic tube with its constant resiliency, thus making the rolling as uniform and even as possible, without the usual severe and frequent jolts which cause the rapid wear and tear of a tire lessening the adherence thereof to the ground and, consequently, the speed of the vehicle;
7. Supporting and strengthening of the portion of the outer casing nearest the beads thus preventing the disintegration of the canvas fabric, which is a frequent cause of a blow-out at this place;
8. Practically entire prevention of blow-outs because of the absorption of the shocks and the ventilation by the ducts, preventing generation of excessive heat;
9. Protection of the pneumatic tube against perforations;

10. Prevention of flat tires in cases of a blow-out and thereby overturning of vehicle;

11. Finally a better and longer service of the outer casing and less wear and tear of the tread surface.

I claim as my invention:

1. In a vehicle tire, an outer casing of any ordinary make, a separate member provided within said casing freely bearing against the inner wall of said casing and dividing the inner space thereof into two compartments, one filled with air of atmospheric pressure, and the other adapted to be inflated by compressed air, a plurality of separated elevations provided on said member, so as to freely engage the inner wall of said outer casing, said elevations being sufficiently spaced from each other so as to remain separated even under the pressure due to the weight of the vehicle, thus constituting mutually independent movable elements insuring the elastic support of the outer casing, said elevations forming distinct channels intermediate the side walls of said outer casing, said channels intersecting to permit direct communication of the free spaces between said elevations with the outer air, thereby insuring a continuous and efficient cooling of said elevations.

2. In a vehicle wheel tire, an outer casing having an air vent, a member having air channels and disposed within the outer casing to produce compartments between itself and the outer casing filled with air at atmospheric pressure, a second member of flexible rubber united to said first member and constituting therewith an inflatable inner tube, said second member having positioning means adapted to intimately bear against the beads of the outer casing on inflation of the inner tube.

3. In an inner tube for a vehicle wheel tire, a member having air channels therein, a second member of flexible rubber united to said first member, and constituting therewith an inflatable inner tube, and positioning devices on said second member adapted to bear against the beads of the usual outer casing on inflation of the inner tube.

4. In an inner tube for a vehicle wheel tire, a member having air channels therein, a second member of flexible rubber united to said first member, and constituting therewith an inflatable inner tube, and flaps on said second member adapted to bear against the beads of the usual outer casing on inflation of the inner tube.

In testimony whereof I affix my signature.

MARIE NICOLAS ALBERT DEVELAY.